(No Model.)
E. A. SPERRY.
ELECTRIC LOCOMOTIVE.
No. 478,139. Patented July 5, 1892.
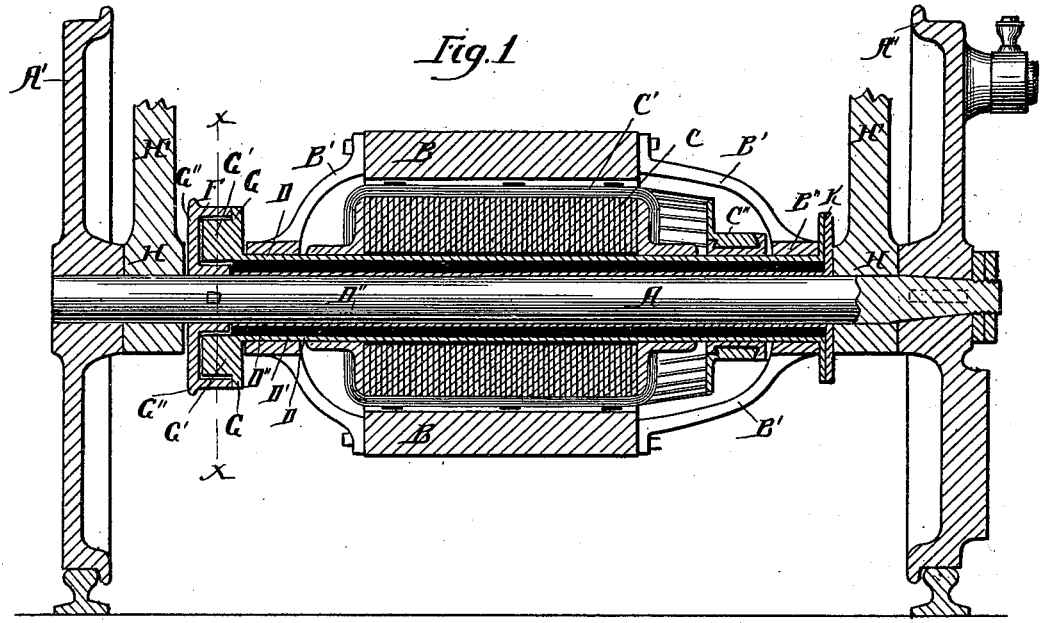
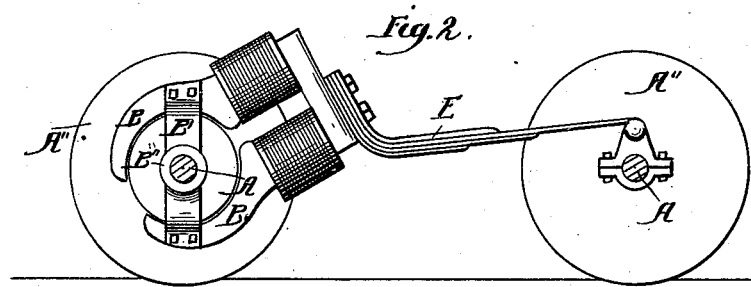
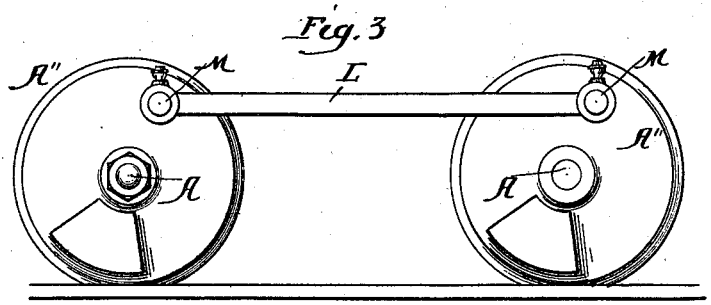
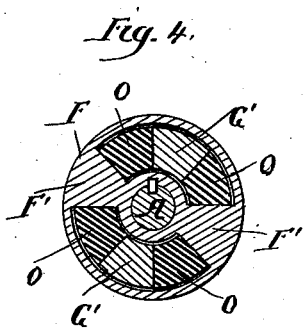
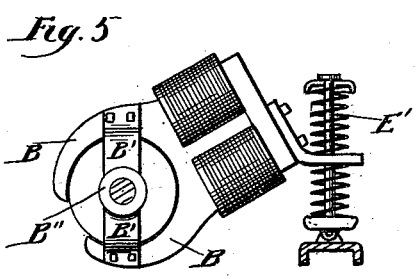
Witnesses:
H. B. Halleck
H. E. Goodman
Inventor:
Elmer A. Sperry

UNITED STATES PATENT OFFICE.

ELMER A. SPERRY, OF CHICAGO, ILLINOIS.

ELECTRIC LOCOMOTIVE.

SPECIFICATION forming part of Letters Patent No. 478,139, dated July 5, 1892.

Application filed April 8, 1891. Serial No. 388,117. (No model.)

*To all whom it may concern:*

Be it known that I, ELMER A. SPERRY, a citizen of the United States, residing at Chicago, Cook county, Illinois, have invented a new and useful Improvement in Systems of Power Transmission for Electric Machines, of which the following is a full, clear, and exact specification.

My invention relates to the mounting of electric motors or other electric machines upon car-axles or other rotating shafts and the providing of suitable power connections between such motor and shaft, whereby a driving connection may be sustained between the electric machine and the shaft with a minimum degree of injury to the former. This I accomplish by means of elastic supports and driving connections shown in the accompanying drawings, wherein—

Figure 1 is a sectional view of a motor mounted upon a car-axle. Fig. 2 shows a method of supporting the motor. Fig. 3 is a side view of the car-wheels and connecting-pitman. Fig. 4 is a sectional view of the clutch or interlocking device, taken on the line $x\,x$, Fig. 1; and Fig. 5 shows another method of elastically supporting the motor.

Like parts are indicated by the same letters throughout the several views.

A is an axle, upon which are mounted the wheels A' and A", the wheel A" being removable, as shown.

B B are the field-pieces of the motor. The armature of the motor, composed of core C and wire C', and the commutator C" are mounted upon a hollow spindle D. About the axle A is a brass or other metallic bushing D', which fits the axle loosely. The inside diameter of the hollow spindle D is greater than the outside diameter of the brass bushing, so that the spindle and armature may be slipped over the axle A, the wheel A" being removed, and will leave a space D" between the spindle and the bushing. This space D" is filled with rubber or other suitable elastic material. In this manner the armature of the machine is mounted upon and elastically supported by the axle, which it is to drive or which may be employed to drive it. The pole-pieces B of the motor are supported and guided by the bars or caps B', which terminate in the journals B" upon the hollow spindle. The rear of the motor may be supported in any convenient manner, two forms being shown in Figs. 2 and 5. In Fig. 2 a spring-support E extends to the other axle of the truck. In Fig. 5 a support in the form of a heavy upright coiled spring E' is shown. Any other method might be employed without affecting my invention. I, however, prefer a cushion-support.

The advantage of having the motor and particularly the armature thus elastically supported will be readily understood. The molecular impact occasioned by irregularities in the track upon which the wheels roll, as in passing over frogs, crossings, &c., and which tends to destroy the insulation upon the wire of the motor, is prevented by this means.

I come now to the description of the driving connection between the motor and axle. It is essential to the life of the motor that this connection be elastic in order to prevent shocks and jars being communicated to the armature, causing abrasion of the insulation. Keyed to the axle A is the disk or wheel, upon the inner face of which are perforations F' F'.

G is a flange forming a part of the hollow spindle D and having the projections G' G', which extend between the projections F' F'. Between the projections on these two wheels are inserted blocks of rubber or other elastic cushions O. It will be seen that when the armature of the motor is made to revolve the projections upon the flange of the spindle will bear through the rubber cushions upon the projections attached to the wheel F, and thus cause the axle to revolve. This feature, taken in connection with the elastic support, is especially adapted for the transmission of power by a crank and pitman or connecting-rod for the reason that the delivery of such power is of an irregular nature. Especially is this irregularity noticed as the crank passes its centers, when a perceptible jerk always manifests itself, owing to the lost motion in the joints, which invariably exists where machinery is operated under the ordinary working conditions. This jerk operates to cause abrasion of the insulation upon the wires of the machine and especially the revolving part. The elastic driving medium lessens the severity of the shock and neutralizes almost entirely the evil effects upon the insulation.

The elastic cushions, which support and which are interposed in the driving connection, being of rubber or other material which may be injured by oil from the bearings getting upon it, I have provided against this in the following manner: To prevent oil from the motor-journals and the journals H H, carrying the car-supports H' H', getting to the elastic medium, I have at one end extended a flange G" upon the wheel F, which will tend to throw off the oil, and at the other end I have brought together and turned outward into a flange the end of the hollow spindle and the bushing, as shown at K.

In Fig. 3 is shown a driving connection between the two axles of a truck, consisting of the connecting-pitman L, connected at its ends with the crank-pins M M upon the wheels.

I have shown my improvements in connection with the application of electric power to the driving of a car; but they could obviously be in the same manner employed in any instance where it is sought to turn a shaft by means of an electric motor, and I do not wish therefore to be understood as limiting myself to the precise application of my invention which is herein shown. The bushing D' should be of brass or like metal to prevent rusting or corroding together, which invariably takes place where surfaces of like metals are presented with only a slight movement between them.

The part described as the "elastic power-transmitting connection," located in the fly-wheel and between the hollow armature-shaft and the axle, will readily be understood to subserve the purpose of a cushion to relieve the shock due to the action of the reciprocating power-transmitting device and prevent such shock from being transmitted to the armature.

I do not care to limit myself to the exact power-transmitting device illustrated, as a number of other well-known forms could be used in place of the crank and pitman shown, and, furthermore, I do not care to limit myself to the exact form or position of the cushion, it being readily understood that its function would be performed were it located anywhere between the reciprocating power-transmitting device and the rotating part of the electric machine.

I claim as new and desire to secure by Letters Patent—

1. In a system of power transmission for an electric machine, a crank and pitman, a revolving part of the electric machine, and an elastic power-transmitting portion between the crank and the revolving part.

2. In a system of power transmission for an electric machine, an axle, an armature provided with a hollow spindle mounted upon the axle, a bushing surrounding the axle, an elastic supporting medium between the bushing and the hollow spindle, and oil-guards at the ends of the spindle, as and for the purpose specified.

3. In a system of power transmission for an electric machine, an axle, an armature provided with a hollow spindle mounted loosely upon the axle, an elastic driving connection between the spindle and the axle, journal-bearings in proximity to said connection, and oil-guards at the ends of the journal-bearings, substantially as and for the purpose specified.

4. In combination with the revolving part of an electric machine, consisting in part of a hollow spindle, a car-axle which the spindle encircles, and an elastic supporting medium between the spindle and the axle, journal-boxes for the axle near the ends of the hollow spindle, and oil-guards mounted upon the axle between the journal-bearing and the elastic support, substantially as specified.

5. In a system of power transmission for an electric machine, an axle, a revolving part of such machine supplied with a hollow spindle encircling the axle, but separated from it by a space, a continuous bushing within the space fitting loosely upon the axle, and an elastic medium interposed between the spindle and the bushing, in combination with driving projections extending from both the axle and the spindle and engaging through an elastic medium interposed between them, substantially as and for the purpose specified.

6. In a system of power transmission for an electric machine, a crank-shaft, a revolving portion of such machine supplied with a hollow spindle mounted upon said shaft, an elastic support between the crank-shaft and the hollow spindle, and an elastic driving medium between such shaft and the revolving part.

7. In combination with the revolving part of an electric machine, consisting in part of a hollow spindle, a car-axle which the spindle encircles, an interlocking driving connection between one end of the spindle and the axle, and a removable wheel on the other end of the axle.

8. In a system of power transmission for an electric machine, the combination of the following elements: a revolving part consisting of two detached but synchronously-revolving portions, one bearing the armature and the other bearing the reciprocating connection, a reciprocating power-transmitting device, and a cushion connection mounted within the revolving part between the detached portion and the armature.

9. In a system of power transmission for an electric machine, the combination of the following elements: a revolving part consisting of two detached but synchronously-revolving portions, one bearing the armature and the other bearing a crank-pin, a reciprocating power-transmitting device, and a cushion connection mounted within the revolving part between the crank-pin and the armature.

Executed this 2d day of April, 1891.

ELMER A. SPERRY.

In presence of—
ELMER E. JOHNSON,
W. R. GOODMAN.